United States Patent Office 2,854,370
Patented Sept. 30, 1958

2,854,370

COMPOSITION AND METHOD FOR PHOSPHATE COATING OF METAL

Max Kronstein, New York, N. Y., assignor to Oakite Products, Inc., a corporation of New York No Drawing. Application October 4, 1957
Serial No. 688,125

10 Claims. (Cl. 148—6.15)

The invention relates to phosphate coating compositions, to the manner of their preparation, and to their use in phosphate coating processes.

The primary object of the invention is to increase the effectiveness of phosphate coating compositions and processes.

The chemical industry recognizes the need of accelerators in the formation of phosphate coatings on metals and has utilized a number of approaches to this goal. The usual methods rely on inorganic oxidation accelerators, such as nitrates, for instance, sodium nitrate. These are supposed to form nitrites at the bath temperature, and then to decompose in the presence of iron, thereby oxidizing the $Fe^{++}$ to $Fe^{+++}$. Soluble nitrites have also been used instead, and chlorates have been mentioned.

Another approach in accelerating the metal phosphatizing compounds has been the addition of salts of metals which are lower in the electromotive series than the metals to be coated. Such salts were those of copper, silver, molybdenum or lead.

A third approach has been the use of so-called reduction accelerators, such as sodium bisulfite, or hydrosulfuric acid ($H_2S_2O_4$) or its salts.

Certain organic additives also have been used, such as additives containing nitrogen (aniline, toluidine, pyridine) or amine-salts, or organic compounds having a constitution similar to alizarine or oxychinoline.

Others have added organic derivatives of selenium, such as its saccharates, glyconates, or glycerates. Also certain other organic compounds have been used, such as sugar, starch, or other OH-containing compounds.

Tannins such as quebracho extract, which has been described as a phenolic compound, and other bark extracts, are also used. These extracts have complex compositions, some components being reactive and to be classified among various chemical groups, while some at least contain OH groups.

The use of the most effective of these bark extracts is limited in the amount of possible concentration in the phosphatizing solution, because of the fact that the extracts are soluble in water or in sodium phosphate solutions only to a small extent.

All these additives have been intended to incorporate some specific quality into the metal phosphatizing compounds. In many cases very small amounts of the additives were applied.

The present invention is aimed at incorporating into the treating solutions compounds having a generally higher level of chemical reactivity, such components being added in such an amount as to form an essential part of the total solids in the treating material.

I have discovered that the addition of unsaturated alcohols containing at least one triple bond and at least one OH group, or, preferably, unsaturated polyhydroxy alcohols containing at least one triple bond, under such conditions as to be soluble to the extent of at least about one part in three parts of water, improves the effectiveness of phosphate coating solutions. If such alcohols are not soluble to the necessary extent, then the invention contemplates procedures for rendering them more soluble. The naturally soluble or solubilized alcohols then form an accelerator which aids in the formation of a more satisfactory phosphate coating on metals such as iron and steel.

Some of the accelerating compounds are known in the art as tertiary acetylenic alcohols, such as

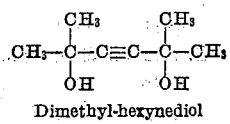

Dimethyl-hexynediol or

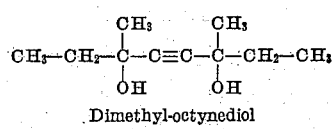

Dimethyl-octynediol

The OH groups may form part of a straight chain structure such as $HO-CH_2-C{\equiv}C-CH_2-OH$ (2 butyne-1.4 diol). Other such compounds can be used.

Also, one or more OH groups can be located in different positions relative to the triple-bond group, such as in

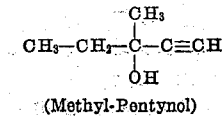

(Methyl-Pentynol)

or

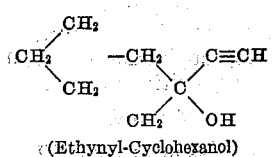

(Ethynyl-Cyclohexanol)

Other combinations between a triple-bond group and one or more hydroxyl groups can be used.

As a suitable amount of these materials, their content in the complete coating solution should amount to at least one percent of the total solids content of the complete phosphatizing compound.

Where the alcohols are not sufficiently soluble, they may be solubilized by the addition of other alcohols of the same type, of formamide, or of alkyl substituted formamides such as methyl formamide.

When formamide is used, it may also be desirable to add certain acids or their anhydrides or salts, particularly molybdic, tungstic and vanadic acids, which, as is described in my application entitled "Increasing the Solubility of Metal Accelerators in Phosphatizing Solutions," Serial No. 499,762, filed April 6, 1955, now abandoned, are rendered more effective as accelerating agents in the presence of formamide.

This invention has as a further object the increase in the concentration of bark extracts by dissolving the extracts first in a water soluble organic amide, such as formamide, and by then diluting this solution with water and making it part of the phosphatizing solution.

The following examples represent the formation of aqueous solutions of the alcohols for use in making up phosphate coating solutions.

*Example 1*

In cases where the triple-bond alcohol is water soluble, a 1:1 solution in water is made and this solution is added to the components of the phosphatizing solution. This can be done without the application of heat, for instance, in the case of the propargyl alcohol ($HC{\equiv}C-CH_2OH$).

Example II

Where the solubility is of a lesser order, as in the case of dimethyl-hexynediol, a solution may be made containing 1 gram of the alcohol in 3 grams of water at 55° C.

Example III

Where the water solubility is of a still lower order, clear solutions can be obtained by the use of additives. For instance, dimethyl-octynediol is dissolved in 1:1 ratio in propargyl alcohol at around 45° C. This solution is diluted 1:1 with water, and a clear solution is obtained.

Example IV

One gram of dimethyl-octynediol is dissolved in 2 grams of water at 55° C. and no clear solution was obtained. 0.5 gram formamide are added. Upon mixing, the solution becomes clear. When diluted with 20 grams additional water, the solution remains clear.

Example V

Two components of different solubility are used as follows: 1 gram of 2 butyne-1.4 diol is dissolved in 2 grams of water at 45° C. To this solution 2 grams of dimethyl-octynediol are added. No clear solution is obtained. Upon adding 0.4 gram of formamide, the solution becomes clear and, when diluted with 25 grams of water, it remains clear.

Example VI 230 grams of monosodium phosphate and 6 grams of a wetting agent (Triton X–45) (see "Condensed Chemical Dictionary," fourth edition, 1950, page 677) are dissolved in half a gallon of water. 6.8 grams of dimethyl hexyndiol are dissolved in 25 grams of water at 60° C. and are added to the phosphate solution. 3.4 grams of phosphoric acid (or 4 grams of an 85% phosphoric acid) are added and the solution is diluted to 4 gal. It is circulated in a spray application tank and used as a spray solution in a phosphatizing process.

Example VII

The procedure is as in Example VI, except that instead of 6.8 grams of hexyndiol, a mixed solution is used containing 3.4 grams of hexyndiol and 3.4 grams corn sugar.

Example VIII

One gram of hexyndiol is dissolved in 2 grams formamide at 55° C.

0.2 gram of vanadium pentoxide are dispersed in this solution at 60° C. A mixture is obtained of dissolved and not-fully-dissolved metal oxide, which is added to 25 grams of water. This water solution is light yellow and a slight sedimentation, yellowish in color, appears. Upon addition of 5 grams of monosodium phosphate and 25 grams of water at approximately 95° C., the solution becomes colorless with a fine cloudy appearance. The fine sludge also is colorless. Upon addition of a few drops of 85% phosphoric acid the solution clears to a cloudless state.

Example IX 14 grams of dimethyl hexyndiol are dissolved under application of heat in 5.1 grams of formamide and 5.1 grams of vanadic pentoxide are added to the hot solution. This mixture is added to 230 grams of monosodium phosphate anhydrous and 9 grams of wetting agent (Tween 20) (see "Condensed Chemical Dictionary," fourth edition, 1950, page 681) in half a gallon of water. This solution is further diluted to 4 gallons and is used in spray application on plain steed. Dip treatment compounds can be produced in a similar manner.

Example X

The procedure was as in Example IX, except that 14 grams of dimethyl octynediol was used instead of hexyndiol. The resulting pH of the solution was between 3.5 and 4.0. It was adjusted before application to a pH of 4.4, using a NaOH solution for the adjustment.

Example XI

The procedure was as in Example IX, except that 5.1 grams tungstic acid was used instead of vanadic acid, or vanadic pentoxide.

The following examples show how formamide may be used for increasing the solubility of difficultly soluble tannins.

Example XII

In dissolving 9.3 grams of quebracho extract in half a gallon of a concentrate for a metal phosphatizing solution, it was observed that only a very small amount of the quebracho actually entered permanently into the solution. The rest settled out again. Nevertheless, the paint bonding qualities of the resulting phosphate coating on steel as a base for an OD enamel paint film of approximately 1 mil thickness under saltfog exposure were considerably increased by the entering into solution of such soluble organic matter from the quebracho extract, as had been capable of entering the solution in view of its very limited solubility.

According to the invention, the concentration of soluble organic active matter is increased by first dissolving the 9.3 grams of quebracho extract in 13 grams of formamide. A solution is obtained which shows very little or no sedimentation and which can be diluted with water without precipitation of the organic material.

The quebracho-formamide solution, or its water diluted form, is made a part of a metal phosphatizing compound, such as 230 grams of monosodium phosphate, 6 grams of a wetting agent (Triton X–45) and 4 grams of 85% phosphoric acid, which is diluted before or after the addition of the quebracho solution to a desired treating concentration, for instance, to 4 gallons, and which is applied to steel surfaces in the usual technical manner.

This increase in concentration of the active organic matter increases the paint bonding qualities of the coating. In comparing the paint bonding life of these surfaces with those produced with a low-concentration quebracho-containing phosphatizing compound (without the use of this invention), the effect of the invention is clearly evident.

Example XIII 3.3 grams of quebracho powder were dissolved by heating with 18 grams of dimethyl formamide. The resultant homogeneous solution was diluted 1 part to 3 parts of water without precipitation.

This solution was then further diluted 1 to 1 with formamide. Again, a true solution was obtained.

A sample of the solution prepared in accordance with the first paragraph of this example was added to a commercial iron phosphating bath. No precipitation occurred.

Example XIV 6.5 grams of sumac tannin were boiled in 60 grams of water. Most of the material remained undissolved and the filtrate was only slightly colored.

6.5 grams of sumac tannin were heated with 20 grams of dimethyl formamide and 8 grams of formamide. Nearly all the tannin was dissolved. A dark brown filtrate was obtained.

One-half of this filtered solution was diluted 1 to 4 with water. The other half was further diluted 2 to 1 with formamide, and this solution diluted with water. Clear solutions were obtained.

Example XV

A number of types of triple-bond alcohols have been described above, such as the tertiary acetylenic alcohols with more than one OH group of a type which can be described as a form of acetylenic glycols, or straight chain alcohols with one OH group, or alcohols with one or more OH groups where the OH group was located in different position.

The present example uses a hexyndiol where the two methyl groups of the dimethyl hexyndiol (Example VI) were replaced by two phenyl groups; that is, the diphenyl hexyndiol was used. It was used in the following formulation: 14 grams of diphenyl hexyndiol were dissolved in 100 milliliters of water. 230 grams of monosodium phosphate anhydrous and 9 grams of wetting agent (Tween 20) were added together with an increase of the water to 1000 milliliters. At first a solid crust was formed, which was dispersed in the coating material, then 2.5 grams of molybdic anhydride were added with further stirring; and the resulting product, further diluted to 4 gallons, was sprayed on 1010 steel in a pressure spray laboratory unit, followed by the usual chromic oxide rinse. A satisfactory coating on steel was obtained.

Six panels were coated, and then the coating was stripped off again by immersion in a solution of 600 milliliters of hydrochloric acid (37.2%) and 300 milliliters of formaldehyde. The weight loss of the panels was determined to give the amount of coating which had been formed on these panels. By dividing the resulting weight difference, in milligrams, by the square foot area on which this coating had been formed, it was found that the panels had a coating weight of 103.4 milligrams per square foot, which is considerably higher than coating weights generally produced without triple-bond alcohols.

The current tentative and proposed Government specifications, such as the proposed Military Specification of the Army Ordnance Department for the Treatment of Metal Surfaces with Iron Phosphates, prior to Painting, and the Tentative Frankford Arsenal Purchase Description for the Cleaning, Preparation and Varnishing of Steel Cartridge Cases (January 28, 1953), do not expect higher coating weights for such phosphate coatings than between 40 and 80 milligrams per square foot. The results of the example surpass these current expectations.

*Example XVI*

To facilitate the dispersion of the unsaturated alcohol, 14 parts diphenyl hexyndiol are dissolved in 60 parts of dimethyl formamide and 2.5 grams of molybdic anhydride are dispersed in 40 grams of dimethyl formamide. These dispersions are added to a heated solution of 230 grams of monosodium phosphate anhydrous and 9 grams of wetting agent in 1000 milliliters of water at about 80° C. with a strong agitation. This solution is further diluted with warm water at around 80° C. to 4 gallons and applied in the spray chamber as in Example XV.

Again a satisfactory phosphate coating was obtained. Again six panels were weighed, their coating was removed and the weight difference determined in milligrams and this weight of the dissolved coating was divided by the square foot area of coated surface. The determined coating weight was 96.3 milligrams per square foot, that is again considerably above the expected coating weight for similar specification phosphate coatings without triple-bond alcohols.

*Example XVII*

As an example for a single OH group triple-bond alcohol containing an aromatic group the phenyl butynol was used, whose formula can be described as

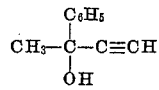

14 grams of phenyl butynol was dissolved in 100 milliliters of water. 230 milliliters of monosodium phosphate anhydrous and 9 grams of wetting agent (Tween 20) were added together with an increase of the water to 100 milliliters. After the dispersion had been obtained, 2.5 grams of molybdic anhydride were added with stirring and the resulting product was further diluted to 4 gallons and was sprayed on 1010 steel panels, followed by the usual chromic acid rinse.

Again a satisfactory coating was obtained and the coating weight was determined as described in Example XV. The obtained coating weight was in this case 91.5 milligrams per square foot.

*Example XVIII*

The same phenyl butynol was used in accordance with the method shown in Example XVI, and again a satisfactory coating was obtained. The stripped coating weight was, in this case 97.1 milligrams per square foot.

Having shown in these examples how the invention is applied in typical cases, the effect of the invention can further be presented. But different forms of the application or compositions can be used besides those shown in the examples.

With the new invention using active organic materials which are water soluble or which have been brought into a water soluble combination, or using reactive organic materials of limited solubility in water, but increasing their concentration in water solutions by the application of formamide and its derivatives, more effective phosphatizing compounds can be produced. More uniform coatings are obtained, and, where desirable, higher coating weights can be achieved than were obtained from identical solutions having a lower concentration of reactive organics or having no organics at all.

In applying a gilsonite asphalt-linseed oil test lacquer as test film over such coatings, the film adhesion was superior under saltfog exposure to comparative phosphate coatings produced without the use of this invention.

The increased coating weights of these materials have a better impact resistance than commercial zinc-phosphate coatings of similar coating weights.

When phosphatized metal surfaces have been exposed for two or more days before paint application, they show generally a decrease in paint adhesion when tested with such thin films as the gilsonite asphalt film. The invention provides for phosphate coatings which are less sensitive in this respect and so allow a wider time-interval between phosphatizing and paint application.

In measuring the profiles produced by commercial phosphate coatings and those based on the invention, the new surface profiles, as measured with such instruments as the brush surface analyzer, show a uniform development on various areas of the panels on the surface coated with new compounds, which are more uniformly developed than on other materials tested.

Measurement of the degree of insolubilization which occurs in the application of the water-spray solution on the metal surface which has been sprayed, shows that the new active groups produce a considerable degree of insolubilization when measured by conductivity measurements. These are performed by immersing the panels in water of known electrical resistance and measuring in short time intervals the decrease in resistance by the dissolving of the unconverted materials. Compared with comparative treatments without the new components or without the increased content in reactive limited-soluble organic components, the new surfaces show a considerably slower drop in electrical resistance during the usual test period of 3 minutes.

While in the examples formamide has been mentioned as a solubilizing agent, derivatives of formamide in which one or both of the hydrogens in the —$NH_2$ group have been replaced by other radicals, and especially the alkyl-substituted formamides such as methyl formamide may be used in substantially the same proportions. Those compounds are preferred which are liquid below 100° C., and which leave behind no harmful residues when the coating is rinsed in the conventional manner and then heated to dryness. Formamide is especially useful in this respect since all its elements are volatile and are driven off when the coating is heated.

While quebracho and sumac extracts are given by way of example above, other tannins are also effective in improving the application of phosphate coatings, especially other plant bark extracts which are of limited solubility in phosphatizing baths containing non-ionic wetting agents. In general, these appear to be tannins having catechol residues, such as chestnut and catechu extracts.

This application is a continuation in part of my application Serial No. 499,749, filed April 6, 1955, now abandoned.

While I have described herein some embodiments of my invention, I wish it to be understood that I do not intend to limit myself thereby except within the scope of the claims hereto or hereinafter appended.

I claim:

1. A phosphate coating composition consisting principally of water and at least one phosphate coating agent selected from the group consisting of phosphoric acid and salts thereof, said composition containing at least about one percent of an accelerator consisting essentially of an unsaturated alcohol containing at least one triple bond, said accelerator being soluble to the extent of at least one part in three parts of water.

2. A phosphate coating composition consisting principally of water and at least one phosphate coating agent selected from the group consisting of phosphoric acid and salts thereof, said composition containing at least about one percent of an accelerator consisting essentially of an unsaturated alcohol containing at least one triple bond, said alcohol being less soluble in water than one part in three parts of water, said accelerator including at least one substance selected from the group consisting of formamide and alkyl-substituted formamides in an amount sufficient to render the alcohol soluble to the extent of at least one part in three parts of water.

3. A composition as claimed in claim 2 further containing at least one compound selected from the group consisting of molybdic, tungstic and vanadic acids and the anhydrides thereof.

4. An aqueous solution containing an unsaturated alcohol containing at least one triple bond in an amount substantially greater than the amount which is soluble in water alone and at least one compound selected from the group consisting of molybdic, tungstic and vanadic acids and the anhydrides thereof in an amount greater than is soluble in water alone, and at least one substance selected from the group consisting of formamide and alkyl-substituted formamides in an amount sufficient to render such alcohol soluble in water.

5. A solution as claimed in claim 1 further containing at least one compound selected from the group consisting of molybdic, tungstic and vanadic acids and the anhydrides thereof.

6. A coating solution as claimed in claim 5 further containing a wetting agent.

7. A method of phosphate coating metal surfaces which comprises bringing into contact with such surfaces a phosphate coating composition as claimed in claim 1.

8. A method of phosphate coating metal surfaces which comprises bringing into contact with such surfaces a phosphate coating composition as claimed in claim 2.

9. A method as claimed in claim 8 in which said solution further contains at least one compound selected from the group consisting of molybdic, tungstic and vanadic acids and the anhydrides thereof.

10. A method of increasing the solubility in water of an unsaturated alcohol containing at least one triple bond and of at least one compound selected from the group consisting of molybdic, tungstic and vanadic acids and the anhydrides and salts thereof, which comprises dissolving the alcohol and the compound in at least one substance selected from the group consisting of formamide and alkyl-substituted formamides and adding the resulting solution to water, the compound being present in an amount greater than is soluble in water alone.

References Cited in the file of this patent

UNITED STATES PATENTS

| | | |
|---|---|---|
| 2,046,061 | Curtin et al. | June 30, 1936 |
| 2,487,007 | Walker et al. | Nov. 1, 1949 |
| 2,502,441 | Dodd et al. | Apr. 4, 1950 |